(12) United States Patent
Harris et al.

(10) Patent No.: US 11,167,528 B2
(45) Date of Patent: Nov. 9, 2021

(54) LAMINATED GLASS ARTICLE WITH DETERMINED STRESS PROFILE AND METHOD FOR FORMING THE SAME

(71) Applicant: Corning Incorporated, Corning, NY (US)

(72) Inventors: Jason Thomas Harris, Horseheads, NY (US); Guangli Hu, Berkeley Heights, NJ (US); John Christopher Mauro, Boalsburg, PA (US)

(73) Assignee: CORNING INCORPORATED, Corning, NY (US)

( * ) Notice: Subject to any disclaimer, the term of this patent is extended or adjusted under 35 U.S.C. 154(b) by 587 days.

(21) Appl. No.: 15/767,789

(22) PCT Filed: Oct. 12, 2016

(86) PCT No.: PCT/US2016/056532
§ 371 (c)(1),
(2) Date: Apr. 12, 2018

(87) PCT Pub. No.: WO2017/066243
PCT Pub. Date: Apr. 20, 2017

(65) Prior Publication Data
US 2018/0304588 A1 Oct. 25, 2018

Related U.S. Application Data

(60) Provisional application No. 62/241,373, filed on Oct. 14, 2015.

(51) Int. Cl.
*B32B 17/06* (2006.01)
*C03C 21/00* (2006.01)
*B32B 37/14* (2006.01)

(52) U.S. Cl.
CPC ............ *B32B 17/06* (2013.01); *B32B 37/144* (2013.01); *C03C 21/002* (2013.01); *B32B 2250/03* (2013.01); *B32B 2250/40* (2013.01)

(58) Field of Classification Search
CPC ..... C03C 21/002; B32B 17/06; B32B 37/144; B32B 2250/03; B32B 2250/40
See application file for complete search history.

(56) References Cited

U.S. PATENT DOCUMENTS 3,533,888 A 10/1970 Eppler et al.
3,582,454 A 6/1971 Giffen
(Continued)

FOREIGN PATENT DOCUMENTS

CN 1014764467 A 6/2010
CN 102791646 A 11/2012
(Continued)

OTHER PUBLICATIONS

Ussler, et al., Phase equilibria along a basalt-rhyolite mixing line: implications for the origin of calc-alkaline intermediate magma, 1989, pp. 232-244, Contrib Mineral Petrol, Chapel Hill, NC USA.
(Continued)

*Primary Examiner* — Travis M Figg
(74) *Attorney, Agent, or Firm* — Daniel J. Greenhalgh

(57) ABSTRACT

A glass laminate includes a glass core layer having a core coefficient of thermal expansion (CTE) and a glass cladding layer adjacent to the core layer and having a cladding CTE that is less than the core CTE such that the core layer is in tension and the cladding layer is in compression. A stress profile of the glass laminate includes a compressive peak disposed between an outer surface of the cladding layer and an inner surface of the cladding layer.

23 Claims, 5 Drawing Sheets

(56) References Cited

U.S. PATENT DOCUMENTS

| | | | |
|---|---|---|---|
| 3,597,305 A | 8/1971 | Giffen | |
| 3,630,704 A | 12/1971 | Gardinkel et al. | |
| 3,673,049 A * | 6/1972 | Giffen | C03C 3/087 428/213 |
| 3,676,043 A | 7/1972 | Anderson et al. | |
| 3,737,294 A | 6/1973 | Dumbaugh et al. | |
| 3,746,526 A | 7/1973 | Giffen et al. | |
| 3,796,013 A | 3/1974 | Brown | |
| 3,798,013 A * | 3/1974 | Inoue | C03C 21/002 65/30.14 |
| 3,849,097 A * | 11/1974 | Giffen | C03C 17/02 65/33.5 |
| 3,857,689 A | 12/1974 | Koizumi et al. | |
| 3,931,438 A * | 1/1976 | Beall | C03B 17/02 428/218 |
| 3,958,052 A | 5/1976 | Galusha et al. | |
| 4,023,953 A * | 5/1977 | Megles, Jr. | C03B 17/025 65/86 |
| 4,102,664 A * | 7/1978 | Dumbaugh, Jr. | C03B 7/00 216/33 |
| 4,180,758 A * | 12/1979 | Notelteirs | H01K 1/44 313/318.07 |
| 4,214,886 A * | 7/1980 | Shay | B32B 37/15 65/121 |
| 4,259,118 A * | 3/1981 | Sack | C03C 3/091 501/66 |
| 4,457,771 A * | 7/1984 | Ambrogi | C03B 5/12 264/148 |
| 5,342,426 A * | 8/1994 | Dumbaugh, Jr. | C03C 23/008 65/23 |
| 5,559,060 A * | 9/1996 | Dumbaugh, Jr. | C03C 3/091 501/66 |
| 6,516,634 B1 * | 2/2003 | Green | C03C 21/00 65/114 |
| 6,844,669 B2 * | 1/2005 | Sugawara | H01J 9/244 313/480 |
| 7,201,965 B2 | 4/2007 | Gulati et al. | |
| 7,207,193 B2 * | 4/2007 | Xun | C03B 17/064 65/115 |
| 7,414,001 B2 * | 8/2008 | Helfinstine | C03B 17/064 501/106 |
| 7,430,080 B2 * | 9/2008 | Cintz | G02B 25/005 359/802 |
| 7,430,880 B2 * | 10/2008 | Butts | C03B 17/068 65/253 |
| 7,514,149 B2 | 4/2009 | Bocko et al. | |
| 7,666,511 B2 * | 2/2010 | Ellison | C03B 17/06 428/426 |
| 7,681,414 B2 * | 3/2010 | Pitbladdo | C03B 17/067 65/193 |
| 7,685,840 B2 * | 3/2010 | Allaire | C03B 18/02 65/29.12 |
| 7,818,980 B2 * | 10/2010 | Burdette | C03B 17/065 65/90 |
| 7,871,703 B2 * | 1/2011 | Shelestak | C03C 3/087 428/410 |
| 8,007,913 B2 | 8/2011 | Coppola et al. | |
| 8,075,999 B2 | 12/2011 | Barefoot et al. | |
| 8,211,505 B2 | 7/2012 | Bocko et al. | |
| 8,304,078 B2 * | 11/2012 | Varshneya | F41H 5/0407 428/410 |
| 8,312,739 B2 * | 11/2012 | Lee | C03C 3/093 65/30.14 |
| 8,321,739 B2 * | 11/2012 | Huschke | H04L 1/06 714/748 |
| 8,415,013 B2 | 4/2013 | Barefoot et al. | |
| 8,518,545 B2 * | 8/2013 | Akiba | C03C 3/085 428/410 |
| 8,561,429 B2 | 10/2013 | Allan et al. | |
| 8,642,175 B2 | 2/2014 | Hashimoto et al. | |
| 8,685,873 B2 * | 4/2014 | Siebers | C03C 3/095 501/68 |
| 8,813,520 B2 | 8/2014 | Hashimoto et al. | |
| 8,916,487 B2 * | 12/2014 | Kawai | C03C 3/097 501/70 |
| 9,302,937 B2 | 4/2016 | Gulati et al. | |
| 9,422,188 B2 | 8/2016 | Garner et al. | |
| 9,957,190 B2 | 5/2018 | Finkeldey et al. | |
| 10,196,295 B2 | 2/2019 | Gulati et al. | |
| 2004/0197575 A1 * | 10/2004 | Bocko | C03B 19/12 428/432 |
| 2005/0083058 A1 * | 4/2005 | Itoh | H01F 13/003 324/318 |
| 2006/0127679 A1 * | 6/2006 | Gulati | C03B 17/02 428/426 |
| 2007/0190340 A1 * | 8/2007 | Coppola | C03C 17/02 428/432 |
| 2009/0202808 A1 * | 8/2009 | Glaesemann | C03C 3/091 428/220 |
| 2009/0217705 A1 * | 9/2009 | Filippov | C03B 18/02 65/99.1 |
| 2009/0220761 A1 * | 9/2009 | Dejneka | C03B 27/04 428/220 |
| 2010/0000259 A1 | 1/2010 | Ukrainczyk et al. | |
| 2010/0009154 A1 * | 1/2010 | Allan | C03C 3/085 428/220 |
| 2010/0029460 A1 * | 2/2010 | Shojiya | C03C 3/085 501/64 |
| 2010/0035038 A1 * | 2/2010 | Barefoot | C03C 3/064 428/220 |
| 2010/0084016 A1 * | 4/2010 | Aitken | C03C 3/064 136/258 |
| 2010/0129944 A1 * | 5/2010 | Shimada | C03C 3/091 438/27 |
| 2011/0017297 A1 * | 1/2011 | Aitken | C03C 3/085 136/260 |
| 2011/0019123 A1 * | 1/2011 | Prest | G02B 7/007 349/58 |
| 2011/0067447 A1 * | 3/2011 | Zadesky | C03C 21/002 65/30.14 |
| 2011/0200805 A1 * | 8/2011 | Tomamoto | C03B 23/203 428/213 |
| 2011/0281093 A1 * | 11/2011 | Gulati | C03C 21/00 428/213 |
| 2011/0294648 A1 * | 12/2011 | Chapman | C03C 21/002 501/63 |
| 2011/0312483 A1 * | 12/2011 | Nakashima | C03C 21/002 501/70 |
| 2011/0318555 A1 * | 12/2011 | Bookbinder | C03B 17/068 428/213 |
| 2012/0040146 A1 * | 2/2012 | Garner | C04B 41/4572 428/192 |
| 2012/0194974 A1 * | 8/2012 | Weber | C03C 21/002 361/679.01 |
| 2012/0208028 A1 * | 8/2012 | Hashimoto | C03B 17/064 428/410 |
| 2012/0216569 A1 * | 8/2012 | Allan | C03C 21/002 65/30.14 |
| 2012/0219792 A1 * | 8/2012 | Yamamoto | C03C 3/093 428/336 |
| 2012/0236477 A1 * | 9/2012 | Weber | B32B 17/06 361/679.01 |
| 2012/0236526 A1 * | 9/2012 | Weber | C03C 21/002 361/807 |
| 2013/0063885 A1 * | 3/2013 | Shedletsky | H05K 5/03 361/679.21 |
| 2013/0224492 A1 * | 8/2013 | Bookbinder | C03C 21/002 428/410 |
| 2013/0236666 A1 * | 9/2013 | Bookbinder | C03C 21/002 428/34.4 |
| 2014/0109616 A1 * | 4/2014 | Varshneya | C03C 3/085 65/30.14 |
| 2014/0139978 A1 * | 5/2014 | Kwong | H04M 1/0202 361/679.01 |
| 2014/0141217 A1 * | 5/2014 | Gulati | C03B 17/06 428/212 |
| 2014/0174131 A1 * | 6/2014 | Saito | B23K 37/0408 65/112 |

(56) References Cited

U.S. PATENT DOCUMENTS

| | | | | |
|---|---|---|---|---|
| 2014/0227524 | A1* | 8/2014 | Ellison | C03C 3/091 |
| | | | | 428/410 |
| 2014/0370264 | A1* | 12/2014 | Ohara | G06F 1/1626 |
| | | | | 428/220 |
| 2015/0030816 | A1 | 1/2015 | Uemura et al. | |
| 2015/0030827 | A1 | 1/2015 | Gomez et al. | |
| 2015/0037552 | A1 | 2/2015 | Mauro | |
| 2015/0251383 | A1 | 9/2015 | Beall et al. | |
| 2017/0141217 | A1 | 5/2017 | Shirakawa et al. | |
| 2018/0304588 | A1* | 10/2018 | Harris | B32B 17/06 |

FOREIGN PATENT DOCUMENTS

| | | |
|---|---|---|
| CN | 103476727 A | 12/2013 |
| CN | 103702952 A | 4/2014 |
| EP | 1376647 A2 | 1/2004 |
| GB | 1157898 A | 7/1969 |
| JP | 59-139005 A | 8/1984 |
| JP | 2011-148683 A | 8/2011 |
| JP | 2011-527661 | 11/2011 |
| JP | 2013028512 A | 2/2013 |
| JP | 2013-518800 A | 5/2013 |
| JP | 2014-521582 A | 8/2014 |
| JP | 2015-006959 A | 1/2015 |
| JP | 2015-511573 A | 4/2015 |
| KR | 10-2009-0027259 A | 3/2009 |
| KR | 10-2012-0026098 A | 3/2012 |
| KR | 10-2013-0135834 A | 12/2013 |
| TW | 201228970 A | 7/2012 |
| TW | 201304951 A | 2/2013 |
| TW | 201326060 A | 7/2013 |
| WO | 2004/055837 A1 | 7/2004 |
| WO | 2004/094321 A2 | 11/2004 |
| WO | 2011/041484 A1 | 4/2011 |
| WO | 2011/065293 A1 | 6/2011 |
| WO | 2011/097314 A2 | 8/2011 |
| WO | 2011103798 A1 | 9/2011 |
| WO | 2012/001914 A1 | 1/2012 |
| WO | 2012026098 A1 | 3/2012 |
| WO | 2012/074983 A1 | 6/2012 |
| WO | 2012/125857 A1 | 9/2012 |
| WO | 2013/016157 A1 | 1/2013 |
| WO | 2013/088856 A1 | 6/2013 |
| WO | 2013/116420 A1 | 8/2013 |
| WO | 2013/154034 A1 | 10/2013 |
| WO | 2013065648 A1 | 10/2013 |
| WO | 2014030738 A1 | 2/2014 |
| WO | 2014/055837 A2 | 4/2014 |

OTHER PUBLICATIONS

Whittington, The viscosity of hydrous phonolites and trachytes, Feb. 9, 2000, pp. 209-233, Chemical Geology 174, Hannover, Germany.

Borrelli et al., "Glass Strengthening with an Ultrafast Laser," dated 2008, pp. 185-189, Paper M404, International Congress on Applications of Lasers & Electro-Optics.

Clasen, Preparation and Sintering of High-Density Green Bodies to High-Purity Silica Glasses, Jun. 11, 1986, pp. 335-343, Journal of Non-Crystalline Solids 89, Amsterdam.

Eagan et al., Bubble Formation in Glass by Reaction with Si and Si-Ge Alloys, Journal of the American Ceramic Society, 1975, vol. 58, pp. 300-301.

Fillery et al.; "Ion-Exchanged Glass Laminates that Exhibit a Threshold Strength"; J. Am. Ceram. Soc., 90,8 (2007) pp. 2502-2509.

Flugel, Thermal Expansion Calculation for Silicate Glasses at 210° C based on a Systematic Analysis of Global databases, dated Feb. 2010, pp. 191-201, Glass Technol.: Dur. J. Glass Sci. Technol., Part A, vol. 51, No. 5.

Giordano, et al. Glass transition temperatures of natural hydrous melts: a relationship with shear viscosity and implications for the welding process, Oct. 22, 2003, pp. 105-118, Journal of Volcanology and Geothermal Research 142, Munich, Germany.

Gy, Rene; I on Exchange for Glass Strenghening; Nov. 2007; Materials Science & Engineering; vol. 149, pp. 159-165.

Lange, et al.. Heat capacities of Fe2O3-bearing silicate liquids, 1992, pp. 311-320, Contrib Mineral Petrol, Princeton, NY USA.

Lapp, "AMLCD Substrates Trends in Technology: Technical Information Paper," dated Nov. 2014, pp. 1-5, Corning Incorporated, New York.

Richet, et al., Energetics of water dissolution in trachyte glasses and liquids, May 25, 2004, pp. 5151-5158, Geochimica et Cosmochimica Acta, vol. 68, No. 24., Easton, PA USA.

Richet, et al., Water and the density of silicate glasses, Nov. 5, 1999, pp. 337-347, Contrib Mineral Petrol, Urbana, IL USA.

Rivers, et al., Ultrasonic Studies of Silicate Melts, Aug. 10, 1987, pp. 9247-9270, Journal of Geophysical Research, vol. 92, Berkeley, CA USA.

International Search Report and Written Opinion PCT/US2016/056532 dated Jan. 20, 2017.

Chinese Patent Application No. 201680060537.4; Office Action dated Sep. 15, 2020; 19 Pages; Chinese Patent Office.

European Patent Application No. 16794098.0 Office Action dated Nov. 12, 2020; 7 Pages; European Patent Office.

International Search Report and Written Opinion of the International Searchign Authority; PCT/US2012/047515; dated Oct. 19, 2012.

International Search Report and Written Opinion, dated Dec. 3, 2013, pp. 1-10, International Patent Application No. PCT/US2013/028093, European Patent Office, The Netherlands.

R. Clasen; "Preparation and Sintering of High-Density Green Bodies to High-Purity Silica Glasses"; Journal of Non-Crystalline Solids 89 (1987); pp. 335-344.

Taiwan Patent Application No. 105133150; Office Action dated Sep. 9, 2020; 8 Pages; Taiwan Patent Office.

Japanese Patent Application No. 2018-519355 Notice of Reasons for Refusal dated Oct. 30, 2020; 4 Pages; (2 pages of English Translation and 2 pages of Original Document); Japanese Patent Office.

\* cited by examiner

LAMINATED GLASS ARTICLE WITH DETERMINED STRESS PROFILE AND METHOD FOR FORMING THE SAME

This application claims the benefit of priority under 35 U.S.C. § 371 to International Application No. PCT/US2016/056532, filed on Oct. 12, 2016, which claims the benefit of priority to U.S. Provisional Application No. 62/241,373, filed Oct. 14, 2015, the content of each of which is incorporated herein by reference in its entirety.

BACKGROUND

1. Field

This disclosure relates to glass articles, and more particularly to laminated glass articles comprising a plurality of glass layers and methods for forming the same.

2. Technical Background

Glass articles can be used in a wide variety of products including, for example, auto-glazing, architectural panels, appliances, and cover glass (e.g., for touch-screen devices such as smartphones, tablets, laptop computers, and monitors). Relatively large flaws can be introduced into the surfaces of glass articles during use. For example, is has been observed that, when a smartphone is dropped onto a rough surface such as asphalt, the local indentation caused by contact with sharp features of the rough surface can cause flaws as deep as about 300 μm in the surface of the cover glass. Thus, it would be desirable to provide a glass article with improved resistance to breakage caused by deep flaws to enable improved mechanical reliability and drop performance.

SUMMARY

Disclosed herein are glass articles with determined stress profiles and methods for forming the same.

Disclosed herein is a glass laminate comprising a glass core layer comprising a core coefficient of thermal expansion (CTE) and a glass cladding layer adjacent to the core layer and comprising a cladding CTE that is less than the core CTE such that the core layer is in tension and the cladding layer is in compression. A stress profile of the glass laminate comprises a compressive peak disposed between an outer surface of the cladding layer and an inner surface of the cladding layer.

Also disclosed herein is a glass laminate comprising a glass core layer comprising a core coefficient of thermal expansion (CTE) and a glass cladding layer adjacent to the core layer and comprising a cladding CTE that is less than the core CTE, whereby the core layer is in tension and the cladding layer is in compression. A compressive stress of the cladding layer increases with increasing depth from a surface compressive stress at an outer surface of the cladding layer to a peak compressive stress at a peak depth of layer (DOL), decreases with increasing depth from the peak DOL to a constant compressive stress at a first constant DOL, and remains substantially constant with increasing depth from the first constant DOL to a second constant DOL.

Also disclosed herein is a method comprising subjecting a glass laminate to a first ion exchange treatment. The glass laminate comprises a glass core layer, a glass cladding layer adjacent to the glass core layer, and a coefficient of thermal expansion (CTE) mismatch between the glass cladding layer and the glass core layer to generate a surface compressive stress at an outer surface of the glass laminate prior to subjecting the glass laminate to the first ion exchange treatment. Subjecting the glass laminate to the first ion exchange treatment increases the surface compressive stress to an intermediate compressive stress value. The glass laminate is subjected to a second ion exchange treatment to decrease the surface compressive stress to a final compressive stress value.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
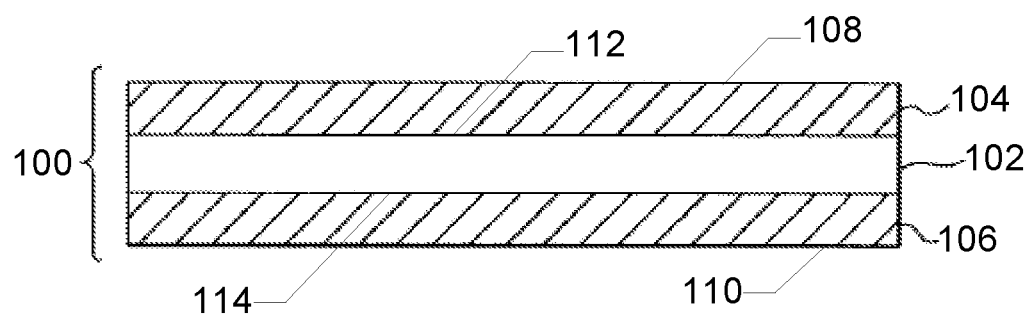
FIG. 1 is a cross-sectional view of one exemplary embodiment of a glass article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "average coefficient of thermal expansion," or "average CTE," refers to the average coefficient of linear thermal expansion of a given material or layer between 0° C. and 300° C. As used herein, the term "coefficient of thermal expansion," or "CTE," refers to the average coefficient of thermal expansion unless otherwise indicated.

In various embodiments, a glass article comprises at least a first layer and a second layer. For example, the first layer comprises a core layer, and the second layer comprises one or more cladding layers adjacent to the core layer. The first layer and/or the second layer are glass layers comprising a glass material, a ceramic material, a glass-ceramic material, or a combination thereof. In some embodiments, the first layer and/or the second layer are transparent glass layers. The core layer has a core CTE, and the cladding layer has a cladding CTE. For example, the core layer is formed from a first glass composition with the core CTE and the cladding layer is formed from a second glass composition with the cladding CTE. The core CTE is greater than the cladding CTE such that the core layer is in tension and the cladding layer is in compression, prior to any ion exchange treatment. In some embodiments, a stress profile of the glass laminate comprises a compressive peak disposed within the cladding layer (e.g., between an outer surface of the cladding layer and an inner surface of the cladding layer). Additionally, or alternatively, the stress profile of the glass laminate comprises a constant region disposed within the cladding layer (e.g., between the compressive peak and the inner surface of the cladding layer). In some embodiments, a compressive stress of the cladding layer increases with increasing depth within the glass article from a surface compressive stress at an outer surface of the cladding layer to a peak compressive stress at a peak depth of layer (DOL), decreases with increasing depth within the glass article from the peak DOL to a constant compressive stress at a first constant DOL, and remains substantially constant with increasing depth within the glass article from the first constant DOL to a second constant DOL.

FIG. 1 is a cross-sectional view of one exemplary embodiment of a glass article 100. In some embodiments, glass article 100 comprises a laminated sheet comprising a plurality of glass layers. The laminated sheet can be substantially planar as shown in FIG. 1 or non-planar. Glass article 100 comprises a core layer 102 disposed between a first cladding layer 104 and a second cladding layer 106. In some embodiments, first cladding layer 104 and second cladding layer 106 are exterior layers as shown in FIG. 1. For example, an outer surface 108 of first cladding layer 104 serves as an outer surface of glass article 100 and/or an outer surface 110 of second cladding layer 106 serves as an outer surface of the glass article. In other embodiments, the first cladding layer and/or the second cladding layer are intermediate layers disposed between the core layer and an exterior layer.

Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. In such embodiments, an interface 112 between first cladding layer 104 and core layer 102 and/or an interface 114 between second cladding layer 106 and core layer 102 are free of any bonding material such as, for example, an adhesive, a coating layer, or any non-glass material added or configured to adhere the respective cladding layers to the core layer. Thus, first cladding layer 104 and/or second cladding layer 106 are fused directly to core layer 102 or are directly adjacent to core layer 102. In some embodiments, the glass article comprises one or more intermediate layers disposed between the core layer and the first cladding layer and/or between the core layer and the second cladding layer. For example, the intermediate layers comprise intermediate glass layers and/or diffusion layers formed at the interface of the core layer and the cladding layer. The diffusion layer can comprise a blended region comprising components of each layer adjacent to the diffusion layer (e.g., a blended region between two directly adjacent glass layers). In some embodiments, glass article 100 comprises a glass-glass laminate (e.g., an in situ fused multilayer glass-glass laminate) in which the interfaces between directly adjacent glass layers are glass-glass interfaces.

In some embodiments, core layer 102 comprises a first glass composition, and first and/or second cladding layers 104 and 106 comprise a second glass composition that is different than the first glass composition. The first glass composition and the second glass composition are different from each other prior to chemically strengthening the glass article as described herein. For example, in the embodiment shown in FIG. 1, core layer 102 comprises the first glass composition, and each of first cladding layer 104 and second cladding layer 106 comprises the second glass composition. In other embodiments, the first cladding layer comprises the second glass composition, and the second cladding layer comprises a third glass composition that is different than the first glass composition and/or the second glass composition.

Figure 2:
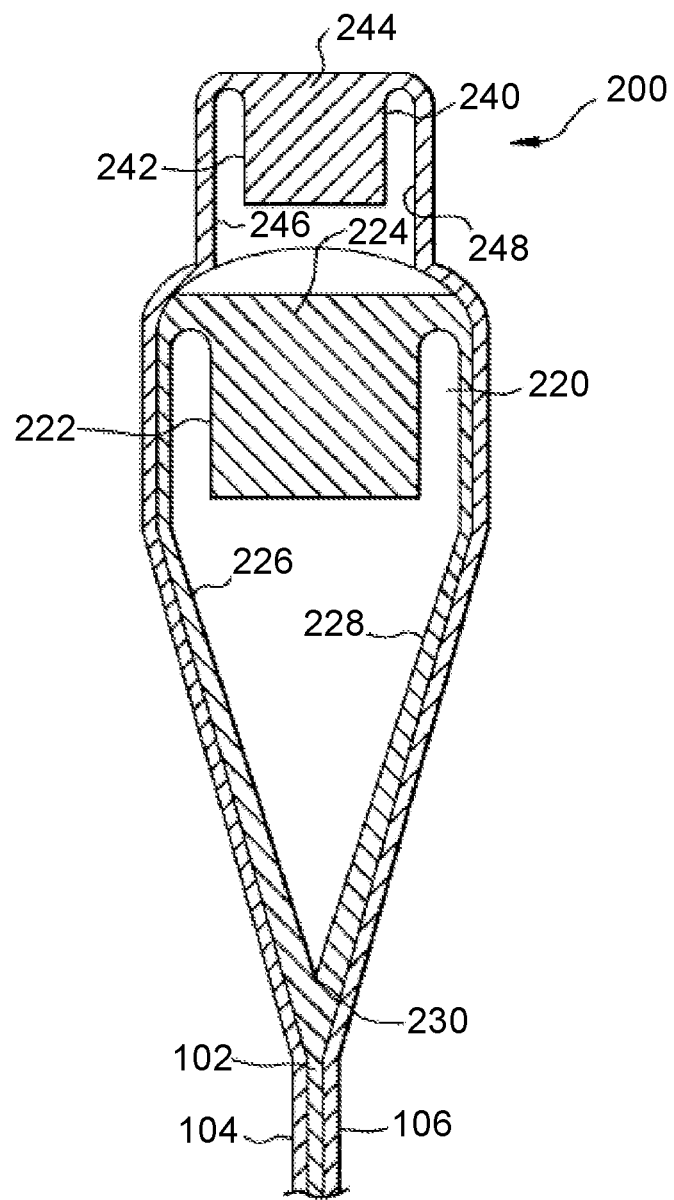
FIG. 2 is a cross-sectional view of one exemplary embodiment of an overflow distributor that can be used to form a glass article.

The glass article can be formed using a suitable process such as, for example, a fusion draw, down draw, slot draw, up draw, or float process. In some embodiments, the glass article is formed using a fusion draw process. FIG. 2 is a cross-sectional view of one exemplary embodiment of an overflow distributor 200 that can be used to form a glass article such as, for example, glass article 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A first glass composition 224 is melted and fed into trough 222 in a viscous state. First glass composition 224 forms core layer 102 of glass article 100 as further described below. Upper overflow distributor 240 comprises a trough 242. A second glass composition 244 is melted and fed into trough 242 in a viscous state. Second glass composition 244 forms first and second cladding layers 104 and 106 of glass article 100 as further described below.

First glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form core layer 102 of glass article 100.

Second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms first and second cladding layers 104 and 106 of glass article 100.

In some embodiments, first glass composition 224 of core layer 102 in the viscous state is contacted with second glass composition 244 of first and second cladding layers 104 and 106 in the viscous state to form the laminated sheet. In some of such embodiments, the laminated sheet is part of a glass ribbon traveling away from draw line 230 of lower overflow distributor 220 as shown in FIG. 2. The glass ribbon can be drawn away from lower overflow distributor 220 by a suitable means including, for example, gravity and/or pulling rollers. The glass ribbon cools as it travels away from lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, glass article 100 comprises the laminated sheet as shown in FIG. 1. In other embodiments, the laminated sheet can be processed further (e.g., by cutting or molding) to form glass article 100.

Although glass article 100 shown in FIG. 1 comprises three layers, other embodiments are included in this disclosure. In other embodiments, a glass article can have a determined number of layers, such as two, four, or more layers. For example, a glass article comprising two layers can be formed using two overflow distributors positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A glass article comprising four or more layers can be formed using additional overflow distributors and/or using overflow distributors with divided troughs. Thus, a glass article having a determined number of layers can be formed by modifying the overflow distributor accordingly.

Although glass article 100 shown in FIG. 1 comprises a laminated sheet, other embodiments are included in this disclosure. In other embodiments, a glass article comprises a laminated tube comprising multiple tubular layers (e.g., formed by one or more annular orifices). For example, a partial cross-section of the laminated tube comprises a laminate structure similar to that shown in FIG. 1. In other embodiments, a glass article comprises a shaped glass article (e.g., formed by shaping or molding a laminated sheet).

In some embodiments, glass article 100 comprises a thickness of at least about 0.05 mm, at least about 0.1 mm, at least about 0.2 mm, or at least about 0.3 mm. Additionally, or alternatively, glass article 100 comprises a thickness of at most about 2 mm, at most about 1.5 mm, at most about 1 mm, at most about 0.7 mm, or at most about 0.5 mm. In some embodiments, a ratio of a thickness of core layer 102 to a thickness of glass article 100 is at least about 0.7, at least about 0.8, at least about 0.85, at least about 0.9, or at least about 0.95. Additionally, or alternatively, the ratio of the thickness of core layer 102 to the thickness of glass article 100 is at most about 0.95, at most about 0.93, at most about 0.9, at most about 0.87, or at most about 0.85. In some embodiments, a thickness of the second layer (e.g., each of first cladding layer 104 and second cladding layer 106) is from about 0.01 mm to about 0.3 mm.

In some embodiments, the first glass composition and/or the second glass composition comprise a liquidus viscosity suitable for forming glass article 100 using a fusion draw process as described herein. For example, the first glass composition of the first layer (e.g., core layer 102) comprises a liquidus viscosity of at least about 100 kP, at least about 200 kP, or at least about 300 kP. Additionally, or alternatively, the first glass composition comprises a liquidus viscosity of at most about 3000 kP, at most about 2500 kP, at most about 1000 kP, or at most about 800 kP. Additionally, or alternatively, the second glass composition of the second layer (e.g., first and/or second cladding layers 104 and 106) comprises a liquidus viscosity of at least about 50 kP, at least about 100 kP, or at least about 200 kP. Additionally, or alternatively, the second glass composition comprises a liquidus viscosity of at most about 3000 kP, at most about 2500 kP, at most about 1000 kP, or at most about 800 kP. The first glass composition can aid in carrying the second glass composition over the overflow distributor to form the second layer. Thus, the second glass composition can comprise a liquidus viscosity that is lower than generally considered suitable for forming a single layer sheet using a fusion draw process.

In some embodiments, glass article 100 is strengthened by a combination of mechanical strengthening and chemical strengthening. For example, glass article 100 comprising a CTE mismatch as described herein (e.g., a glass laminate) is chemically strengthened as described herein to further increase the compressive stress near the outer surface of the second layer and/or to form a compressive peak within the second layer.

In some embodiments, glass article 100 is mechanically strengthened. For example, the second glass composition of the second layer (e.g., first and/or second cladding layers 104 and 106) comprises a different CTE than the first glass composition of the first layer (e.g., core layer 102). Such a CTE mismatch between directly adjacent layers of glass article 100 can result in mechanical strengthening of the glass article. For example, first and second cladding layers 104 and 106 are formed from a glass composition (e.g., the second glass composition) having a lower CTE than a glass composition (e.g., the first glass composition) of the core layer 102. The CTE mismatch (i.e., the difference between the CTE of first and second cladding layers 104 and 106 and the CTE of core layer 102) results in formation of compressive stress in the cladding layers and tensile stress in the core layer upon cooling of glass article 100. In various embodiments, each of the first and second cladding layers, independently, can have a higher CTE, a lower CTE, or substantially the same CTE as the core layer. Surface compressive stresses tend to suppress existing surface flaws from developing into cracks. Higher CTE mismatch results in higher surface compression in the cladding layer. Additionally, a thicker cladding layer results in deeper total compressive DOL. However, such higher surface compressive stress and deeper total compressive DOL also result in increasing tensile stress in the core layer. Accordingly, the various factors should be balanced with one another as described herein.

In some embodiments, the CTE of the first layer (e.g., core layer 102) and the CTE of the second layer (e.g., first and/or second cladding layers 104 and 106) differ by at least about $5 \times 10^{-7}$ °C.$^{-1}$, at least about $15 \times 10^{-7}$ °C.$^{-1}$, at least about $25 \times 10^{-7}$ °C.$^{-1}$, or at least about $30 \times 10^{-7}$ °C.$^{-1}$. Additionally, or alternatively, the CTE of the first layer and the CTE of the second layer differ by at most about $100 \times 10^{-7}$ °C.$^{-1}$, at most about $75 \times 10^{-7}$ °C.$^{-1}$, at most about $50 \times 10^{-7}$ °C.$^{-1}$, at most about $40 \times 10^{-7}$ °C.$^{-1}$, at most about $30 \times 10^{-7}$ °C.$^{-1}$, at most about $20 \times 10^{-7}$ °C.$^{-1}$, or at most about $10 \times 10^{-7}$ °C.$^{-1}$. For example, in some embodiments, the CTE of the first layer and the CTE of the second layer differ by about $5 \times 10^{-7}$ °C.$^{-1}$ to about $30 \times 10^{-7}$ °C.$^{-1}$ or about $5 \times 10^{-7}$ °C.$^{-1}$ to about $20 \times 10^{-7}$ °C.$^{-1}$. In some embodiments, the second glass composition of the second layer comprises a CTE of at most about $66 \times 10^{-7}$ °C.$^{-1}$, at most about $55 \times 10^{-7}$ °C.$^{-1}$, at most about $50 \times 10^{-7}$ °C.$^{-1}$, at most about $40 \times 10^{-7}$ °C.$^{-1}$, or at most about $35 \times 10^{-7}$ °C.$^{-1}$. Additionally, or alternatively, the second glass composition of the second layer comprises a CTE of at least about $10 \times 10^{-7}$ °C.$^{-1}$, at least about $15\times10^{-7\circ}$ C.$^{-1}$, at least about $25\times10^{-7\circ}$ C.$^{-1}$, or at least about $30\times10^{-7\circ}$ C.$^{-1}$. Additionally, or alternatively, the first glass composition of the first layer comprises a CTE of at least about $40\times10^{-7\circ}$ C.$^{-1}$, at least about $50\times10^{-7\circ}$ C.$^{-1}$, at least about $55\times10^{-7\circ}$ C.$^{-1}$, at least about $65\times10^{-7\circ}$ C.$^{-1}$, at least about $70\times10^{-7\circ}$ C.$^{-1}$, at least about $80\times10^{-7\circ}$ C.$^{-1}$, or at least about $90\times10^{-7\circ}$ C.$^{-1}$. Additionally, or alternatively, the first glass composition of the first layer comprises a CTE of at most about $120\times10^{-7\circ}$ C.$^{-1}$, at most about $110\times10^{-7\circ}$ C.$^{-1}$, at most about $100\times10^{-7\circ}$ C.$^{-1}$, at most about $90\times10^{-7\circ}$ C.$^{-1}$, at most about $75\times10^{-7\circ}$ C.$^{-1}$, or at most about $70\times10^{-7\circ}$ C.$^{-1}$.

In some embodiments, glass article 100 is chemically strengthened. For example, glass article 100 is subjected to a first ion exchange treatment to increase the compressive stress in a region of the glass article near an outer surface of the glass article (e.g., an outer portion of the second layer). In some embodiments, the first ion exchange treatment comprises applying a first ion exchange medium to one or more surfaces of glass article 100. The first ion exchange medium comprises a solution, a paste, a gel, or another suitable medium comprising larger ions to be exchanged with smaller ions in the glass matrix (e.g., the glass matrix of the second layer). The terms "larger ions" and "smaller ions" are relative terms, meaning that the larger ions are relatively large compared to the smaller ions and the smaller ions are relatively small compared to the larger ions. Thus, the larger ions have a larger ionic radius than the smaller ions, and the smaller ions have a smaller ionic radius than the larger ions. In some embodiments, the second layer of glass article 100 comprises an alkali aluminosilicate glass. Thus, the smaller ions in the surface layer of the glass and the larger ions in the first ion exchange medium may be monovalent alkali metal cations (e.g., $Li^+$, $Na^+$, $K^+$, $Rb^+$, and/or $Cs^+$). Alternatively, monovalent cations in glass article 100 may be replaced with monovalent cations other than alkali metal cations (e.g., $Ag^+$ or the like). In some embodiments, the second layer of glass article 100 comprises an alkaline earth aluminosilicate glass. Thus, the smaller ions in the surface layer of the glass and the larger ions in the first ion exchange medium may be divalent alkaline earth cations (e.g., $Be^{2+}$, $Mg^{2+}$, $Ca^{2+}$, $Sr^{2+}$, and/or $Ba^{2+}$). In some embodiments, the first ion exchange medium comprises a molten salt solution, and the first ion exchange treatment comprises immersing the laminated glass article in a molten salt bath comprising larger ions (e.g., $K^+$, $Na^+$, $Ba^{2+}$, $Sr^{2+}$, and/or $Ca^{2+}$) to be exchanged with smaller ions (e.g., $Na^+$, $Li^+$, $Ca^{2+}$, and/or $Mg^{2+}$) in the glass matrix. In some embodiments, the molten salt bath comprises a salt (e.g., a nitrate, a sulfate, and/or a chloride) of the larger ions. For example, the molten salt bath comprises molten $KNO_3$, molten $NaNO_3$, or a combination thereof. Additionally, or alternatively, the temperature of the molten salt bath is from about 380° C. to about 450° C., and an immersion time is from about 2 hours to about 16 hours.

By replacing smaller ions in the glass matrix with larger ions at the surface of glass article 100, the compressive stress of the second layer is increased near the outer surface of the glass article. For example, during the first ion exchange treatment, the larger ions from the first ion exchange medium diffuse into an outer portion of the second layer of glass article 100 and the smaller ions from the glass matrix diffuse out of the outer portion of the second layer of the glass article. Thus, the outer portion of the second layer comprises an ion exchanged region of the glass article. The increased concentration of the larger ions in the ion exchanged region causes crowding of the glass matrix and increases the compressive stress of glass article 100 in the ion exchanged region. In some embodiments, subjecting glass article 100 to the first ion exchange treatment increases a surface compressive stress at the outer surface of the glass article (e.g., from an initial surface compressive stress generated by the CTE mismatch) to an intermediate compressive stress value. For example, the intermediate compressive stress value is at least about 200 Mpa, at least about 300 Mpa, at least about 400 Mpa, at least about 500 Mpa, at least about 600 Mpa, at least about 700 Mpa, at least about 800 Mpa, at least about 900 Mpa, or at least about 1000 Mpa. Additionally, or alternatively, the intermediate compressive stress value is at most about 1300 MPa, at most about 1200 MPa, at most about 1100 MPa, at most about 1000 MPa, at most about 900 MPa, or at most about 800 MPa.

In some embodiments, glass article 100 is subjected to a second ion exchange treatment subsequent to the first ion exchange treatment. The second ion exchange treatment can decrease the compressive stress in a region of the glass article near an outer surface of the glass article (e.g., an outer sub-portion of the outer portion of the second layer as described herein). In some embodiments, the second ion exchange treatment comprises applying a second ion exchange medium to one or more surfaces of glass article 100. The second ion exchange medium comprises a solution, a paste, a gel, or another suitable medium comprising smaller ions to be exchanged with larger ions in the glass matrix. For example, the smaller ions in the second ion exchange medium are the same as the smaller ions in the glass matrix involved in the first ion exchange treatment (e.g., $Na^+$, $Li^+$, $Ca^{2+}$, and/or $Mg^{2+}$). Additionally, or alternatively, the larger ions in the glass matrix are the same as the larger ions in the first ion exchange medium involved in the first ion exchange treatment (e.g., $K^+$, $Na^+$, $Ba^{2+}$, $Sr^{2+}$, and/or $Ca^{2+}$). In other embodiments, the smaller ions and the larger ions involved in the second ion exchange treatment are different than the smaller ions and the larger ions involved in the first ion exchange treatment. In some embodiments, the second ion exchange medium comprises a molten salt solution, and the second ion exchange treatment comprises immersing the laminated glass article in a molten salt bath comprising smaller ions (e.g., $Na^+$, $Li^+$, $Ca^{2+}$, and/or $Mg^{2+}$) to be exchanged with larger ions (e.g., $K^+$, $Na^+$, $Ba^{2+}$, $Sr^{2+}$, and/or $Ca^{2+}$) in the glass matrix. In some embodiments, the molten salt bath comprises a salt (e.g., a nitrate, a sulfate, and/or a chloride) of the smaller ions. For example, the molten salt bath comprises molten $NaNO_3$, molten $LiNO_3$, or a combination thereof. Additionally, or alternatively, the temperature of the molten salt bath is from about 380° C. to about 450° C., and an immersion time is from about 2 hours to about 16 hours. In some embodiments, the exposure time (e.g., the immersion time or the time for which the glass article is contacted by the ion exchange medium) of the second ion exchange treatment is less than the exposure time of the first ion exchange treatment. For example, a ratio of the exposure time of the first ion exchange treatment to the exposure time of the second ion exchange treatment is at least about 6, at least about 7, at least about 8, at least about 9, or at least about 10. Additionally, or alternatively, the ratio of the exposure time of the first ion exchange treatment to the exposure time of the second ion exchange treatment is at most about 18, at most about 17, at most about 16, at most about 15, or at most about 14.

By replacing larger ions in the glass matrix with smaller ions at the surface of glass article 100, the compressive stress of the second layer is decreased near the outer surface of the glass article (e.g., an outer portion of the ion exchanged region). Thus, the second ion exchange treatment can partially reverse or undo the stress generated by the ion exchange performed during the first ion exchange treatment by replacing some of the larger ions that diffused into the glass matrix during the first ion exchange treatment or other larger ions within the glass matrix with smaller ions from the second ion exchange medium. For example, during the second ion exchange treatment, the smaller ions from the second ion exchange medium diffuse into an outer portion of the ion exchanged region of the second layer of glass article 100 and the larger ions from the glass matrix diffuse out of the outer portion of the ion exchanged region of the second layer of the glass article. Thus, the outer portion of the ion exchanged region of the second layer comprises an ion exchanged sub-region of the glass article. The decreased concentration of larger ions in the ion exchanged sub-region causes reduced crowding of the glass matrix and decreases the compressive stress in the ion exchanged sub-region. In some embodiments, subjecting glass article 100 to the second ion exchange treatment decreases the surface compressive stress at the outer surface of the glass article (e.g., from the intermediate compressive stress value following the first ion exchange treatment) to a final compressive stress value. For example, the final compressive stress value is at least about 100 MPa, at least about 200 MPa, at least about 300 Mpa, at least about 400 Mpa, at least about 500 Mpa, at least about 600 Mpa, at least about 700 Mpa, at least about 800 Mpa, at least about 900 Mpa, or at least about 1000 Mpa. Additionally, or alternatively, the final compressive stress value is at most about 1300 MPa, at most about 1200 MPa, at most about 1100 MPa, at most about 1000 MPa, at most about 900 MPa, at most about 800 MPa, at most about 700 MPa, at most about 600 MPa, at most about 500 MPa, at most about 400 MPa, or at most about 300 MPa.

Figure 3:
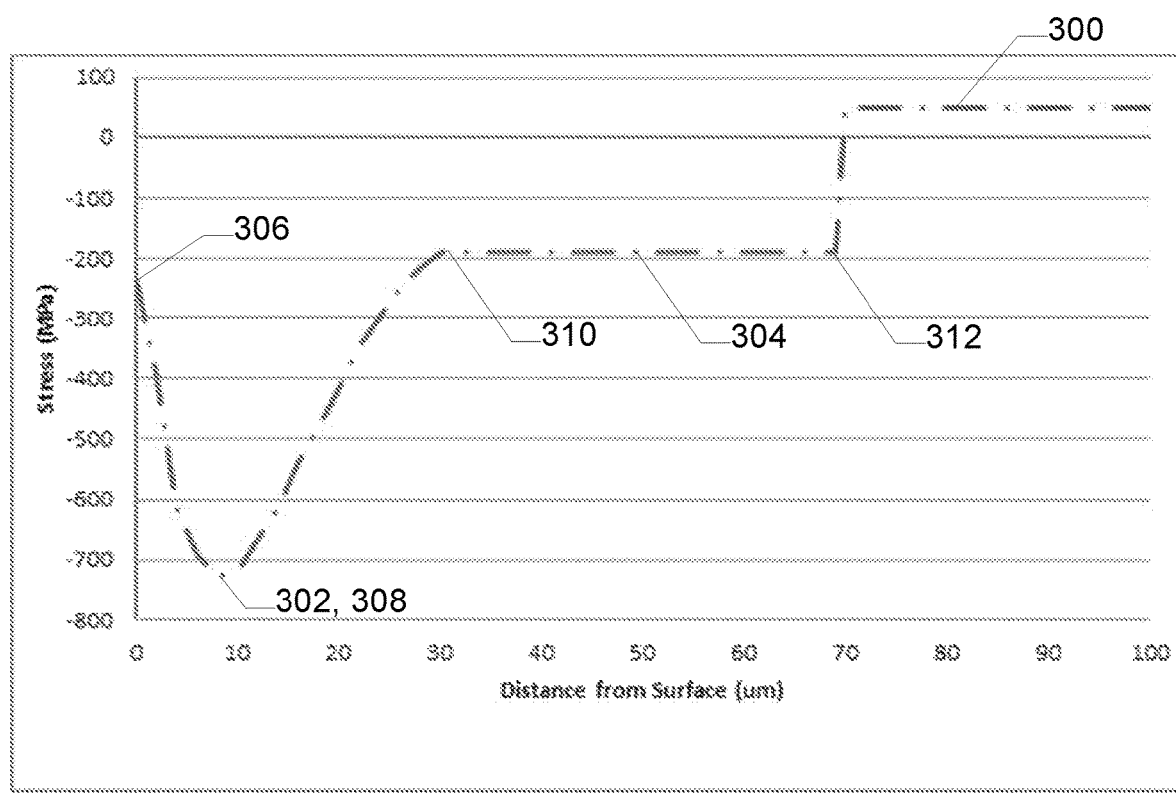
FIG. 3 is a graphical illustration of a stress profile of one exemplary embodiment of a glass article.

FIG. 3 is a graphical illustration of an exemplary stress profile 300 formed by a combination of mechanical strengthening and two-step chemical strengthening (e.g., a first ion exchange treatment and a second ion exchange treatment) as described herein. The stress profile comprises the stress in glass article 100 as a function of depth within the glass article. The depth within glass article 100, given as the distance from an outer surface of the glass article (e.g., outer surface 108 or outer surface 110), is plotted on the x-axis, and the stress is plotted on the y-axis. The depth within the glass article may be referred to herein as depth of layer (DOL). Compressive stress is shown on the negative y-axis, and tensile stress is shown on the positive y-axis. However, the values of compressive and tensile stresses described herein refer to the absolute values of the stresses. Thus, compressive stresses are given herein as positive values as opposed to negative values. It will be recognized that FIG. 3 shows only a portion of the stress profile of glass article 100 through a portion of the thickness of the glass article (e.g., through one clad layer and a portion of the core layer). For a symmetrical glass article as shown in FIG. 1, the stress profile through the portion of the thickness of the glass article at the opposing outer surface is a mirror image of the portion of the stress profile shown in FIG. 3.

In some embodiments, the stress profile of glass article 100 comprises a compressive peak 302 disposed within the second layer. For example, compressive peak 302 is disposed between an outer surface of the second layer (e.g., first and/or second cladding layer 104 and 106 and/or an outer surface of the glass article) and an inner surface of the second layer (e.g., interface 112 and/or interface 114). Compressive peak 302 comprises a point at which, or the midpoint of a series of points over which, a first derivative of the stress profile curve (e.g., a slope of the stress profile curve) changes sign (e.g., from negative to positive) with increasing depth. For example, the compressive stress of the second layer increases with increasing depth to a peak compressive stress at the compressive peak and then decreases with increasing depth from the peak compressive stress at the compressive peak. In some embodiments, the peak compressive stress comprises a maximum compressive stress of glass article 100.

In some embodiments, the stress profile of glass article 100 comprises a constant region 304 disposed between the compressive peak and the inner surface of the second layer. In some embodiments, the constant region comprises a non-ion exchanged region of glass article 100. The non-ion exchanged region comprises a region of the second layer of the glass article that is substantially free or free of ions that diffuse into the second layer of the glass article from the first ion exchange medium, the second ion exchange medium, and/or the first layer of the glass article as described herein. In some embodiments, the first derivative of the stress profile is substantially zero throughout the constant region. Additionally, or alternatively, the slope of a linear trend line of the stress profile, determined using simple linear regression over the constant region, is substantially zero. For example, the first derivative of the stress profile and/or the slope of the linear trend line is between about −7 MPa/μm and about 7 MPa/μm, between about −5 MPa/μm and about 5 MPa/μm, between about −3 MPa/μm and about 3 MPa/μm, or between about −1 MPa/μm and about 1 MPa/μm throughout the constant region. In some embodiments, the first derivative of the stress profile and/or the slope of the linear trend line of the stress profile, determined using simple linear regression over each 5 μm thick segment or each 10 μm thick segment of the constant region, is substantially zero. For example, the constant region is divided into a plurality of segments each having a thickness of 5 μm or 10 μm, and the first derivative of the stress profile and/or the slope of the linear trend line of the stress profile, determined using simple linear regression over each of the plurality of segments is substantially zero. Thus, the stress profile is substantially flat over each 5 μm thick segment or each 10 μm thick segment of the constant region. A constant compressive stress is a mean compressive stress of the glass article within the constant region. In some embodiments, the compressive stress of glass article 100 is within about 20%, within about 10%, within about 5%, within about 2%, or within about 1% of the constant compressive stress throughout the constant region.

In some embodiments, the constant region comprises an entire portion of the stress profile corresponding to the non-ion exchanged portion of the second layer of the glass article. Additionally, or alternatively, the constant region comprises an entire portion of the stress profile disposed between the compressive peak and the inner surface of the second layer over which the first derivative of the stress profile curve or the slope of the linear trend line is substantially zero. For example, the constant region comprises the entire flat portion of the stress profile as opposed to a sub-portion of the flat portion of the stress profile.

In some embodiments, the compressive stress of the second layer increases with increasing depth from a surface compressive stress at an outer surface 306 of the cladding layer to a peak compressive stress at a peak DOL 308 and remains substantially constant with increasing depth within a constant region extending from a first constant DOL 310 to a second constant DOL 312. The compressive stress of the second layer decreases with increasing depth from the peak DOL to the first constant DOL.

The exemplary stress profile shown in FIG. 3 was generated by modeling a glass article having the general configuration shown in FIG. 1 and described herein. The thickness of the core layer is 860 μm. The thickness of each cladding layer is 70 μm. The CTE mismatch between the core layer and each cladding layer is about $35.5\times10^{-7}/°$ C. The compressive stress of each cladding layer prior to any ion exchange treatment (e.g., the compressive stress generated by the CTE mismatch between the core layer and the cladding layers) is 190 MPa. Thus, the compressive stress of the glass article is substantially constant at about 190 MPa throughout the thickness of each cladding layer prior to any ion exchange treatment. The tensile stress of the core layer prior to any ion exchange treatment (e.g., the tensile stress generated by the CTE mismatch between the core layer and the cladding layers) is 31 MPa. Thus, the tensile stress of the glass article is substantially constant at about 31 MPa throughout the thickness of the core layer prior to any ion exchange treatment.

The glass article is subjected to a first ion exchange treatment and a second ion exchange treatment as described herein to form the compressive peak in the ion exchanged region of each cladding layer. As shown in FIG. 3, following the ion exchange treatments, the surface compressive stress of the glass article is 240 MPa. The peak compressive stress is 730 MPa at a peak DOL of 8 μm. The constant compressive stress is 190 MPa, which is the same as the compressive stress of each cladding layer prior to any ion exchange treatment. Thus, the compressive stress in non-ion exchanged regions of the cladding layers is unaffected or substantially unaffected by the ion exchange treatments. The constant region extends from the first constant DOL of 29 μm to the second constant DOL of 70 μm. Thus, in the example shown in FIG. 3, the second constant DOL is equal to the thickness of the cladding layer, indicating that the constant region extends from the first constant DOL to the inner surface of the cladding layer directly adjacent to the core layer. In other embodiments, the second constant DOL is less than the thickness of the cladding layer, indicating that the constant region extends less than the entire distance between the first constant DOL and the inner surface of the cladding layer.

In the example shown in FIG. 3, the compressive stress of the cladding layer increases with increasing depth from the surface compressive stress of 240 MPa at the outer surface of the cladding layer to the peak compressive stress of 730 MPa at the peak DOL of 8 μm, decreases with increasing depth from the peak compressive stress at the peak DOL to the constant compressive stress of 190 MPa at the first constant DOL of 29 μm, and remains substantially constant at the constant compressive stress with increasing depth from the first constant DOL to the second constant DOL of 70 μm.

Although the exemplary stress profile shown in FIG. 3 was generated by modeling, stress profiles of physical glass articles can be determined using, any suitable technique including, for example, a birefringence based measurement technique or a refracted near-field (RNF) technique. Exemplary standards for stress measurement include, for example, ASTM C1422.

In some embodiments, the surface compressive stress at the outer surface of the cladding layer is within about 50%, within about 40%, within about 30%, within about 27%, within about 25%, within about 20%, within about 15%, within about 10%, or within about 5% of the constant compressive stress. Thus, even after being reduced during the second ion exchange treatment, the compressive stress at the outer surface of the cladding layer can be sufficiently high to resist flaws from forming and/or propagating at the surface. For example, the surface compressive stress at the outer surface of the cladding layer is at least about 100 MPa, at least about 200 MPa, at least about 300 Mpa, at least about 400 Mpa, at least about 500 Mpa, at least about 600 Mpa, at least about 700 Mpa, at least about 800 Mpa, at least about 900 Mpa, or at least about 1000 Mpa. Additionally, or alternatively, the surface compressive stress at the outer surface of the cladding layer is at most about 1300 MPa, at most about 1200 MPa, at most about 1100 MPa, at most about 1000 MPa, at most about 900 MPa, at most about 800 MPa, at most about 700 MPa, at most about 600 MPa, at most about 500 MPa, at most about 400 MPa, or at most about 300 MPa.

In some embodiments, the constant region comprises a thickness of at least about 80%, at least about 85%, at least about 90%, or at least about 95% of a thickness of the cladding layer. Additionally, or alternatively, the constant region comprises a thickness of at most about 99.9%, at most about 99%, at most about 95%, or at most about 90% of a thickness of the cladding layer. Additionally, or alternatively, the constant region comprises a thickness of at least about 8 μm to about 300 μm. A relatively thick constant region can help to improve the resistance of the glass article to fracture caused by deep flaws while maintaining a relatively low tensile force in the first layer as described herein.

In some embodiments, the peak compressive stress is at least about 100%, at least about 125%, at least about 150%, at least about 175%, at least about 200%, at least about 225%, at least about 250%, at least about 275%, or at least about 300% greater than the constant compressive stress. Additionally, or alternatively, the peak compressive stress is at least about 100%, at least about 125%, at least about 150%, at least about 175%, at least about 200%, at least about 225%, at least about 250%, at least about 275%, or at least about 300% greater than the surface compressive stress at the outer surface of the cladding layer. Additionally, or alternatively, the peak compressive stress is at least about 200 MPa, at least about 250 MPa, at least about 300 MPa, at least about 400 MPa, at least about 500 MPa, at least about 600 MPa, at least about 700 MPa, at least about 800 MPa, at least about 900 MPa, or at least about 1000 MPa. Additionally, or alternatively, the peak compressive stress is at most about 600%, at most about 575%, at most about 550%, at most about 525%, at most about 500%, at most about 475%, at most about 450%, at most about 425%, at most about 400%, at most about 375%, at most about 350%, at most about 325%, or at most about 300% greater than the constant compressive stress. Additionally, or alternatively, the peak compressive stress is at most about 600%, at most about 575%, at most about 550%, at most about 525%, at most about 500%, at most about 475%, at most about 450%, at most about 425%, at most about 400%, at most about 375%, at most about 350%, at most about 325%, or at most about 300% greater than the surface compressive stress at the outer surface of the cladding layer. Additionally, or alternatively, the peak compressive stress is at most about 1300 MPa, at most about 1200 MPa, at most about 1100 MPa, at most about 1000 MPa, at most about 900 MPa, at most about 800 MPa, at most about 700 MPa, at most about 600 MPa, or at most about 500 MPa. Additionally, or alternatively, the compressive peak is spaced from the outer surface of the cladding layer by a distance of about 0.1 μm to about 50 μm and/or about 0.1% to about 20% of a thickness of the cladding layer.

The presence of the compressive peak can help to prevent flaws from propagating within the glass article to depths that are deeper than the peak DOL. For example, a flaw that is initiated at the surface of the glass article described herein and begins to propagate deeper within the glass article will be met with an increasing compressive stress. Such an increasing compressive stress from the surface of the glass article can help to arrest the propagation of the flaw before the flaw reaches the peak DOL. Thus, the compressive peak can provide improved resistance to flaw propagation compared to a glass article strengthened by mechanical strengthening alone and having a substantially constant compressive stress throughout the total thickness of the cladding layer and/or compared to a glass article strengthened by chemical strengthening alone and having a rapidly decreasing compressive stress deeper into the glass article from the outer surface. Moreover, because the cladding layer is under compressive stress from the CTE mismatch prior to any chemical strengthening, the glass article can have a higher surface compressive stress compared to a glass article strengthened by two-step ion exchange alone. For example, even after reducing the compressive stress in the ion exchanged sub-region during the second ion exchange treatment, the surface compressive stress can remain relatively high. Thus, by combining mechanical strengthening and two-step ion exchange, the benefits of the compressive peak can be achieved without sacrificing the relatively high surface compressive stress that can help to prevent formation of surface flaws.

If a flaw does propagate beyond the peak DOL, the compressive stress extending relatively deep into the glass article (e.g., throughout the constant region) can help to prevent failure of the glass article as a result of the flaw (e.g., by preventing the flaw from reaching the core layer that is in tension). Thus, the presence of the constant region (e.g., provided by mechanical strengthening) can provide improved resistance to failure compared to a glass article strengthened by chemical strengthening alone and having a rapidly decreasing compressive stress deeper into the glass article. Accordingly, the stress profile generated by the combination of mechanical strengthening and two-step ion exchange strengthening as described herein can enable improved performance of the glass article compared to conventional strengthening techniques.

Figure 4:
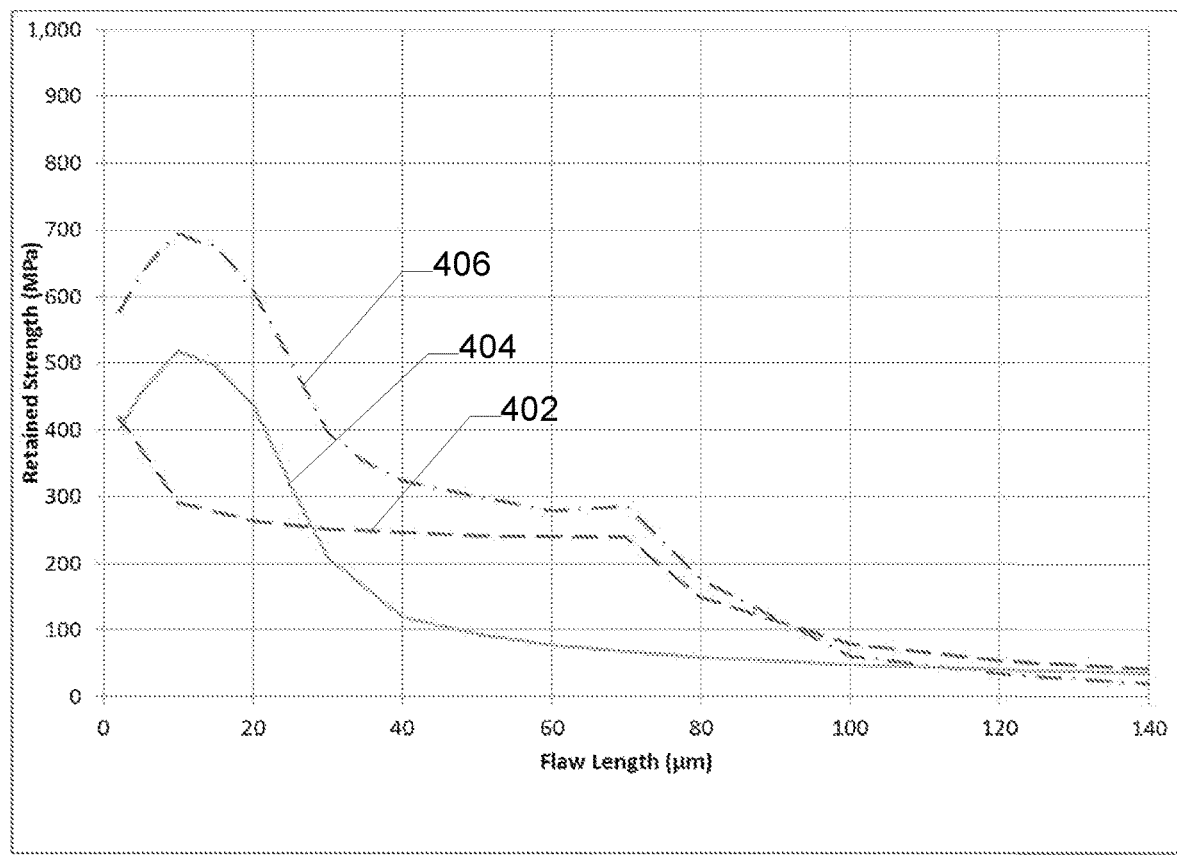
FIG. 4 is a graphical illustration comparing retained strength profiles of a mechanically strengthened glass article, a chemically strengthened glass article, and one exemplary embodiment of a glass article strengthened by a combination of mechanical strengthening and chemical strengthening.

The stress profile of glass article 100, which can be generated by the combination of mechanical strengthening and two-step ion exchange strengthening as described herein, can impart beneficial retained strength characteristics to the glass article. FIG. 4 is a graphical illustration comparing exemplary retained strength profiles of glass articles strengthened by mechanical strengthening alone, two-step ion exchange strengthening alone, and a combination of mechanical strengthening and two-step ion exchange strengthening. The retained strength of the glass article is the strength of the glass article after formation of a flaw having a determined size in the glass article. The strength is the flexural strength of the glass article determined using, for example, a ring-on-ring test method (e.g., as described in ASTM C1499-09), an abraded ring-on-ring test method, a ball-on-ring test method, a three-point bend test method, a four-point bend test method, or another suitable method or technique. The retained strength profiles are represented by the retained strength as a function flaw size. The flaw size, given as the distance from an outer surface of the glass article, or the depth, to which the flaw extends, is plotted on the x-axis, and the retained strength is plotted on the y-axis. The retained strength profiles shown in FIG. 4 were generated using fracture mechanics simulations based on stress profiles resulting from the different strengthening methods. Mechanical retained strength profile 402 is based on a stress profile resulting from mechanical strengthening alone. The mechanical strengthening is the same as described with reference to FIG. 3, but without any ion exchange treatment. Chemical retained strength profile 404 is based on a stress profile resulting from two-step ion exchange strengthening alone. The two-step ion exchange is the same as described with reference to FIG. 3, but performed on a single layer glass article formed from the second glass composition as opposed to a laminated glass article. Combined retained strength profile 406 is based on the stress profile resulting from a combination of mechanical strengthening and two-step ion exchange strengthening and shown in FIG. 3.

As shown in FIG. 4, each of mechanical retained strength profile 402, chemical retained strength profile 404, and combined retained strength profile 406 comprises a relatively high retained strength (e.g., at least about 200 MPa) near the outer surface of the glass article, which can aid in avoiding breakage of the glass article as a result of relatively shallow flaws (e.g., less than about 10 μm). However, combined retained strength profile 406 has a higher retained strength than each of mechanical retained strength profile 402 and chemical retained strength profile 404 deeper into the glass article. For example, the retained strength of combined retained strength profile 406 is higher than that of mechanical retained strength profile 402 for flaw sizes as deep as about 90 μm, and the retained strength of combined retained strength profile 406 is higher than that of chemical retained strength profile 404 for flaw sizes as deep as about 130 μm. Such higher retained strength deep into the glass article can aid in avoiding breakage of the glass article as a result of relatively deep flaws.

Flaws introduced into a cover glass as a result of dropping an electronic device (e.g., a smartphone) often can have flaw sizes of about 70 μm or greater. Thus, improved resistance to breakage resulting from such flaw sizes can translate into improved drop performance for a cover glass having a retained strength profile similar to combined retained strength profile 406 as compared to mechanical retained strength profile 402 and chemical retained strength profile 404. Moreover, the improved resistance to breakage resulting from large flaws can be achieved by combined retained strength profile 406 without substantially increasing the maximum tensile stress of the first layer (e.g., the core layer) as compared to mechanical retained strength profile 402 and/or chemical retained strength profile 404. For example, maintaining the compressive stress at a relatively constant level relatively deep into the second layer (e.g., over the constant region) can help to maintain the area under the compressive portion of the stress profile curve, which is proportional to the maximum tensile stress in the first layer, relatively low while also providing protection against breakage caused by relatively deep flaws. Thus, the maximum tensile stress can be maintained below the frangibility limit. The frangibility limit can be determined, for example, as described in U.S. Patent App. Pub. No. 2010/0035038, which is incorporated herein by reference in its entirety. Additionally, or alternatively, the distance between the first constant DOL and the second constant DOL (i.e., the thickness of the constant region) is sufficiently large to maintain relatively high compressive stress deep into the glass article (e.g., to achieve improved resistance to breakage resulting from large flaws) without increasing the maximum tensile stress to an unacceptable level (e.g., above the frangibility limit).

In some embodiments, position of the compressive peak, or the peak DOL, can be tailored to form a glass article with a determined stress profile adapted for a particular application. For example, the time and/or the temperature of the first ion exchange treatment can be increased such that the ion exchanged region of the second layer extends deeper into the glass article, and the time and/or temperature of the second ion exchange treatment can be increased such that the ion exchanged sub-region of the second layer extends deeper into the glass article. Thus, the position of the compressive peak can be shifted deeper into the glass article, or the peak DOL can be increased. Alternatively, the time and/or the temperature of the first ion exchange treatment can be decreased such that the ion exchanged region of the second layer extends shallower into the glass article, and the time and/or temperature of the second ion exchange treatment can be decreased such that the ion exchanged sub-region of the second layer extends shallower into the glass article. Thus, the position of the compressive peak can be shifted shallower into the glass article, or the peak DOL can be decreased. Positioning the compressive peak deeper within the glass article can help to improve the reliability of the glass article, represented by retained strength, compared to positioning the compressive peak shallower within the glass article, for the same central tension. However, positioning the compressive peak shallower within the glass article can help to improve the strength of the glass article compared to positioning the compressive peak deeper within the glass article, for the same central tension. Thus, the compressive peak can be positioned to balance strength and reliability.

In some embodiments, a method comprises determining a likely flaw depth and subjecting a glass laminate to a first ion exchange treatment and a second ion exchange treatment as described herein such that the peak DOL is substantially equal to or equal to the likely flaw depth. The likely flaw depth can represent the depth of flaws typically experienced by a glass article used in a particular application. For example, the likely flaw depth can be determined by empirical evidence gathered by examining one or more glass articles after use in the particular application.

In some embodiments, glass article 100 is strengthened by interface ion exchange. Interface ion exchange comprises ion exchange between the first layer (e.g., core layer 102) and the second layer (e.g., first cladding layer 104 and/or second cladding layer 106) such that the stress profile of the glass article comprises a compressive spike disposed between the compressive peak and the first layer (e.g., between the compressive peak and an inner surface of the second layer). For example, the compressive spike is disposed between the constant region and the first layer. In some embodiments, the portion of the second layer with the compressive spike comprises an interface ion exchanged region in which the glass composition profile and/or stress profile are generated, at least in part, by diffusion of larger ions into the glass matrix and smaller ions out of the glass matrix within the interface ion exchanged region (e.g., by ion exchange between the cladding layer(s) and the core layer at the interface therebetween as described herein). For example, the interface ion exchanged region can be identified as having a stress profile with a particular shape indicating that it was generated at least partially by ion exchange (e.g., an error function). Additionally, or alternatively, the interface ion exchanged region can be identified as a region at the interface between the compressive region and the tensile region in which compressive stress increases as a function of depth within the glass article, compared to the substantially constant compressive stress within the constant region. In some embodiments, heating glass article 100 during lamination and/or during two-step ion exchange is sufficient to cause the interface ion exchange without any additional or subsequent interface ion exchange heat treatment.

Figure 5:
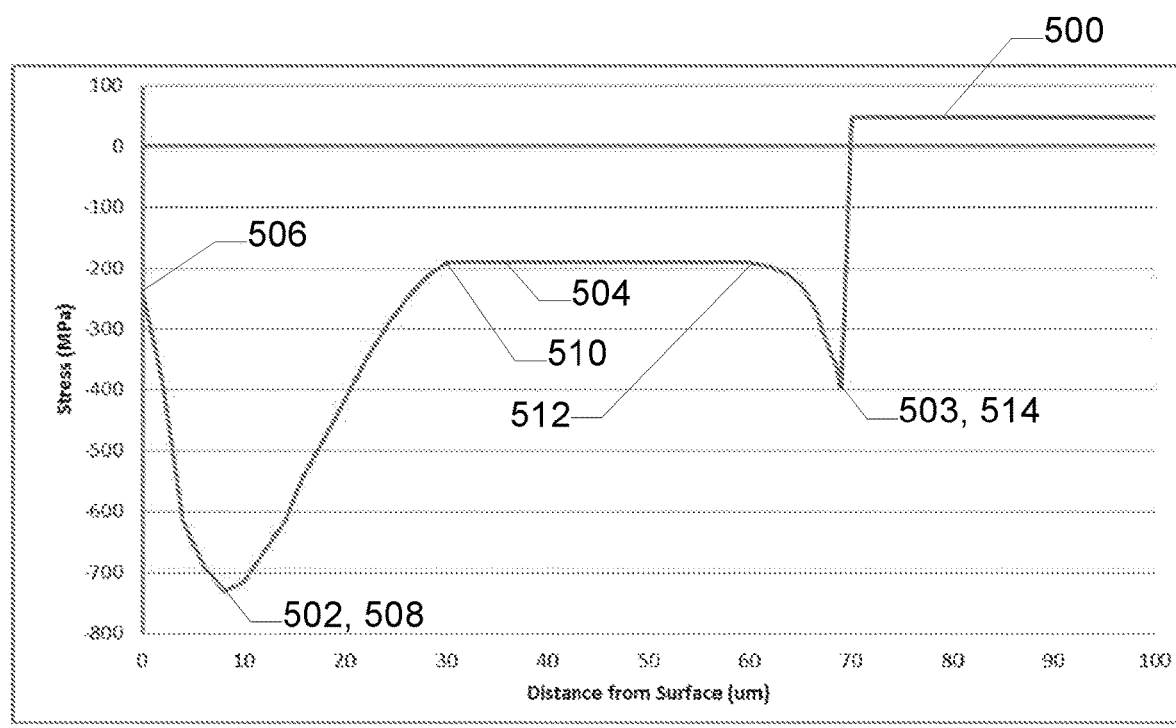
FIG. 5 is a graphical illustration of a stress profile of one exemplary embodiment of a glass article.

FIG. 5 is a graphical illustration of an exemplary stress profile 500 formed by a combination of mechanical strengthening, two-step ion exchange, and interface ion exchange as described herein. The exemplary stress profile shown in FIG. 5 is based on a glass article having the same configuration described herein with reference to FIG. 3, except that the first glass composition of the cladding layers and the second glass composition of the core layer are selected to enable interface ion exchange. For example, the first glass composition comprises a relatively high concentration of relatively large mobile cations (e.g., $K^{2+}$), and the second glass composition comprises a relatively high concentration of relatively small mobile cations (e.g., $Na^{2+}$) such that the large ions diffuse into the cladding layers at the interfaces, and the small ions diffuse out of the cladding layers at the interfaces to cause increased compressive stress in the cladding layers at the interfaces. The exemplary stress profile shown in FIG. 5 comprises a compressive peak 502, a compressive spike 503, and a constant region 504 disposed between the compressive peak and the compressive spike. Compressive spike 503 comprises a region directly adjacent to the inner surface of the cladding layer over which the compressive stress increases with increasing depth. For example, the compressive stress of the second layer increases with increasing depth to a spike compressive stress at the inner surface 514 of the second layer.

As shown in FIG. 5, following the two-step ion exchange and the interface ion exchange, the surface compressive stress of the glass article at an outer surface of the cladding layer 506 is 240 MPa. The peak compressive stress is 730 MPa at a peak DOL 508 of 8 μm. The constant compressive stress is 190 MPa, which is the same as the compressive stress of each cladding layer prior to any ion exchange treatment. Thus, the compressive stress in non-ion exchanged regions of the cladding layers is unaffected or substantially unaffected by the ion exchange treatments. The constant region extends from the first constant DOL 510 of 29 μm to the second constant DOL 512 of 60 μm. Thus, in the example shown in FIG. 5, the second constant DOL is less than the thickness of the cladding layer (e.g., 70 μm in the example shown in FIG. 5), indicating that the constant region extends less than the entire distance between the first constant DOL and the inner surface of the cladding layer. The compressive spike extends from the second constant DOL to the inner surface 514 of the cladding layer. The spike compressive stress is 400 MPa at the inner surface of the cladding layer.

In the example shown in FIG. 5, the compressive stress of the cladding layer increases with increasing depth from the surface compressive stress of 240 MPa at the outer surface of the cladding layer to the peak compressive stress of 730 MPa at the peak DOL of 8 μm, decreases with increasing depth from the peak compressive stress at the peak DOL to the constant compressive stress of 190 MPa at the first constant DOL of 29 μm, remains substantially constant at the constant compressive stress with increasing depth from the first constant DOL to the second constant DOL of 60 μm, and increases with increasing depth from the second constant DOL to the spike compressive stress of 400 MPa at the inner surface of the cladding layer.

The distance between the second constant DOL and the inner surface of the cladding layer, or the thickness of the interface ion exchanged region, can be in a range as described herein with reference to the peak DOL. In various embodiments, the distance between the second constant DOL and the inner surface of the cladding layer can be the same as or different than the peak DOL. The spike compressive stress can be in a range as described herein with reference to the peak compressive stress. In various embodiments, the spike compressive stress can be the same as or different than the peak compressive stress. In some embodiments, the spike compressive stress is between the constant compressive stress and the peak compressive stress. Additionally, or alternatively, the spike compressive stress is between the surface compressive stress and the peak compressive stress.

The increased compressive stress of the compressive spike can further increase the resistance of the glass article to breakage caused by deep flaws without increasing the maximum tension of the tensile region sufficiently to cause the glass article to display frangible behavior. For example, a flaw that propagates beyond the compressive peak will be met with a second region of increasing compressive stress at the compressive spike. Thus, the flaw would reach the tensile stress of the core layer only after overcoming two regions of increasing compressive stress separated by the constant region. Because the compressive spike occupies a relatively thin portion of the second layer, it results in a relatively small increase in tensile stress in the first layer.

In various embodiments, the second layer (e.g., first cladding layer 104 and/or second cladding layer 106) comprise a relatively low CTE, ion-exchangeable glass composition, and the first layer (e.g., core layer 102) comprises a relatively high CTE ion-exchangeable or non-ion-exchangeable glass composition. Exemplary glass compositions that may be suitable for use in the second layer include those described in U.S. Patent App. Pub. Nos. 2014/0141217 and 2015/0030827, each of which is incorporated herein by reference in its entirety. Exemplary glass compositions that may be suitable for use in the first layer include those described in U.S. Patent App. Pub. Nos. 2014/0141217 and 2015/0037552, each of which is incorporated herein by reference in its entirety.

The glass articles described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In various embodiments, a consumer electronic device (e.g., smartphones, tablet computers, personal computers, ultrabooks, televisions, and cameras), an architectural glass, and/or an automotive glass comprises a glass article as described herein.

It will be apparent to those skilled in the art that various modifications and variations can be made without departing from the spirit or scope of the invention. Accordingly, the invention is not to be restricted except in light of the attached claims and their equivalents.

What is claimed is:

1. A glass laminate comprising:
a glass core layer comprising a core coefficient of thermal expansion (CTE); and
a glass cladding layer adjacent to the core layer and comprising a cladding CTE that is less than the core CTE such that the core layer is in tension and the cladding layer is in compression;
wherein a stress profile of the glass laminate comprises (i) a compressive peak disposed between an outer surface of the cladding layer and an inner surface of the cladding layer and
a constant region disposed between the compressive peak and the inner surface of the cladding layer.

2. The glass laminate of claim 1, wherein
a slope of a linear trend line of the stress profile determined using simple linear regression over the constant region is between about −7 MPa/µm and about 7 MPa/µm.

3. The glass laminate of claim 2, wherein a slope of a linear trend line of the stress profile determined using simple linear regression over each 5 µm thick segment of the constant region is between about −7 MPa/µm and about 7 MPa/µm.

4. The glass laminate of claim 2, wherein:
a constant compressive stress is a mean compressive stress of the cladding layer within the constant region; and
a surface compressive stress at the outer surface of the cladding layer is within about 50% of the constant compressive stress.

5. The glass laminate of claim 2, wherein the constant region comprises a thickness of at least about 8 µm or at least about 80% of a thickness of the cladding layer.

6. The glass laminate of claim 2, wherein:
a constant compressive stress is a mean compressive stress of the cladding layer within the constant region; and
the compressive peak comprises a peak compressive stress that is at least about 100% greater than the constant compressive stress.

7. The glass laminate of claim 1, wherein the stress profile of the glass laminate comprises a compressive spike disposed between the constant region and the inner surface of the cladding layer or between the compressive peak and the inner surface of the cladding layer.

8. The glass laminate of claim 1, wherein the compressive peak comprises a peak compressive stress that is at least about 100% greater than the surface compressive stress at the outer surface of the cladding layer.

9. The glass laminate of claim 1, wherein the compressive peak is spaced from the outer surface of the cladding layer by a distance of about 0.1 µm to about 50 µm or about 0.1% to about 20% of a thickness of the cladding layer.

10. A glass laminate comprising:
a glass core layer comprising a core coefficient of thermal expansion (CTE); and
a glass cladding layer adjacent to the core layer and comprising a cladding CTE that is less than the core CTE, whereby the core layer is in tension and the cladding layer is in compression;
wherein a compressive stress of the cladding layer increases with increasing depth from a surface compressive stress at an outer surface of the cladding layer to a peak compressive stress at a peak depth of layer (DOL), decreases with increasing depth from the peak DOL to a constant compressive stress at a first constant DOL, and remains substantially constant with increasing depth from the first constant DOL to a second constant DOL.

11. The glass laminate of claim 10, wherein the compressive stress of the cladding layer increases with increasing depth from the second constant DOL to an inner surface of the cladding layer.

12. The glass laminate of claim 10, wherein the surface compressive stress at the outer surface of the cladding layer is within about 50% of the constant compressive stress.

13. The glass laminate of claim 10, wherein a distance between the first constant DOL and the second constant DOL is at least about 8 μm.

14. The glass laminate of claim 10, wherein a distance between the first constant DOL and the second constant DOL is at least about 80% of a thickness of the cladding layer.

15. The glass laminate of claim 10, wherein the compressive stress of the cladding layer is within about 20% of the constant compressive stress at all depths between the first constant DOL and the second constant DOL.

16. The glass laminate of claim 10, wherein the peak compressive stress is at least about 100% greater than the constant compressive stress.

17. The glass laminate of any of claim 10, wherein the peak compressive stress is at least about 100% greater than the surface compressive stress.

18. The glass laminate of claim 10, wherein the peak DOL is about 0.1 μm to about 50 μm.

19. The glass laminate of claim 10, wherein the peak DOL is about 0.1% to about 20% of a thickness of the cladding layer.

20. The glass laminate of claim 10, wherein a difference between the core CTE and the cladding CTE is at least about $5 \times 10^{-7}/°C$.

21. The glass laminate of claim 10, wherein the cladding layer comprises a glass first cladding layer adjacent to the core layer and a glass second cladding layer adjacent to the core layer, the core layer disposed between the first cladding layer and the second cladding layer.

22. A consumer electronic device, an architectural glass, or an automotive glass comprising the laminated glass article of claim 10.

23. A method comprising:
 subjecting a glass laminate to a first ion exchange treatment, the glass laminate comprising a glass core layer, a glass cladding layer adjacent to the glass core layer, and a coefficient of thermal expansion (CTE) mismatch between the glass cladding layer and the glass core layer to generate a surface compressive stress at an outer surface of the glass laminate prior to subjecting the glass laminate to the first ion exchange treatment, wherein subjecting the glass laminate to the first ion exchange treatment increases the surface compressive stress to an intermediate compressive stress value; and
 subjecting the glass laminate to a second ion exchange treatment to decrease the surface compressive stress to a final compressive stress value, wherein the glass cladding layer comprises a constant region having a compressive stress substantially unaffected by the first and second ion exchange treatments.

* * * * *